Jan. 17, 1967  P. M. REMALEY  3,298,722

HANDLE AND LOCKING MEANS

Filed Aug. 18, 1964

INVENTOR.
PAUL M. REMALEY
BY Charles L. Lovercheck
attorney

United States Patent Office 3,298,722
Patented Jan. 17, 1967

3,298,722
HANDLE AND LOCKING MEANS
Paul M. Remaley, 169 W. 25th St., Erie, Pa. 16502
Filed Aug. 18, 1964, Ser. No. 390,310
6 Claims. (Cl. 287—53)

This invention relates to valves and, more particularly, to handles in combination with valves.

In prior valve handles, the handle works the threaded member loose because of the repeated twisting of the handle to tighten or loosen the valve.

The valve handle disclosed herein has means on it for preventing it from working loose during the time that it is repeatedly subjected to torque in first one direction and then in the other as when it is opened and closed repeatedly over long periods of time.

It is, accordingly, an object of this invention to provide an improved combination handle and valve.

Another object of the invention is to provide an improved valve handle which is simple in construction, economical to manufacture, and simple and efficient to use.

Still another object of the invention is to provide a combination valve and handle with an improved means to prevent a threaded fastener from loosening and thereby releasing the handle from the valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
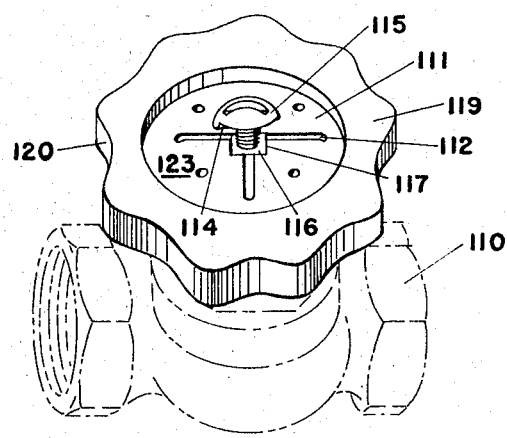
FIG. 1 is an isometric view of an improved handle and valve according to the invention.

Now with more particular reference to the drawing, the valve and handle shown are intended to overcome the deficiencies in previous valve handles in that such previous handles ordinarily will work their threaded fastening member loose, be the fastening member nut or screw, because of the repeated twisting of the handle to tighten and loosen it. The present invention overcomes this problem by providing radially extending grooves 12 in the upwardly facing bottom 11 of the counterbore and mating ribs 14 on the underside of the nut 15 in FIG. 3, similar ribs 114 are provided on the underside of the head 115 of the screw in FIG. 1.

Referring now particularly to FIG. 1, the valve 110 has a stem thereon which has the non-circular tapered upper end 116 thereon. The non-circular tapered upper end is received in the non-circular tapered opening 117 in the upper end of the valve handle and the screw having the head 115 is threadably received in the threaded opening therein.

The valve handle has the boss 118 which is integrally attached to the outwardly extending flange 119 which has the axially extending flange 120 which has the scallops on the outside. These scallops provide hand engaging surfaces.

The counterbore 111 has the upwardly facing bottom surface 123 which has the radially extending grooves 112 therein. These grooves are shaped as an intaglio of the ribs 114.

The screw head 115 has the ribs 114 thereon which are spaced equal to the spacing of the grooves 112 in the handle and are adapted to fit therein.

Thus, the screw 115 may be tightened and as the threads thereon move the screw down into tight engagement with the handle, the grooves 112 will receive the ribs 114 and the ribs will ride over the edges of the grooves until the screw is fairly tight. During the final part of a turn the ribs will climb out of one groove 112, ride over the surface 123 and finally snap into the next succeeding groove 112. Thus, it will take considerable torque on the screw itself to loosen it while the handle will be held securely by the tapered surface 116 on the valve stem and rotation of the handle 119 will not loosen the screw.

Figure 2:
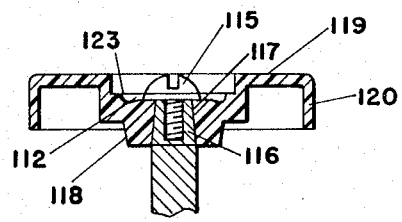
FIG. 2 is a longitudinal cross sectional view of the handle.
Figure 3:
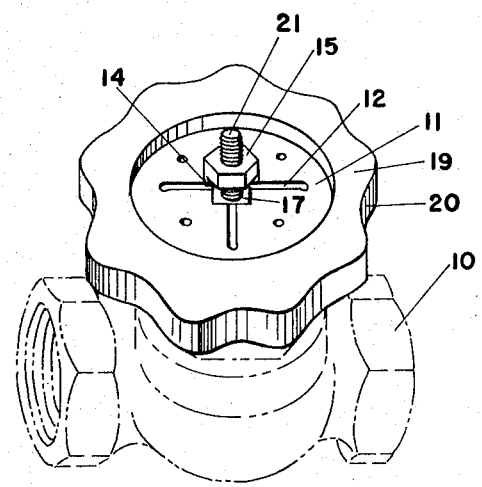
FIG. 3 is an isometric view of a different embodiment of the combination.

In the embodiment of the invention shown in FIG. 3, the valve 10 has the valve stem thereon with a tapered non-circular upper end 17 similar to that shown in FIGS. 1 and 2. The handle has the outwardly extending flange 19 thereon with the axially ending peripheral flange 20 similar to that shown in FIG. 3.

A boss is formed on the handle similar to that shown in FIGS. 1 and 2 with a counterbore 11 having the grooves 12 in the bottom thereof and these grooves are adapted to receive the ribs 14 on the nut 15 when the nut is tightened. The valve stem has the threaded end 21 thereon which receives the nut 15. When the nut is tightened, the ribs 14 will enter the grooves 12 as the nut moves downward, and when they first engage a groove, they will ride up over the edge over counterbore 11, and finally, when the nut is fairly tight, the ribs will be held securely in position in the final groove 12. Thus, the nut 15 will not be loosened when the handle is rotated and thereby loosened and tightened.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a valve and a handle therefor, said valve having a rotatable stem extending therefrom, a generally rectangular, outwardly tapering end portion on said valve stem,
said handle being generally disk shaped and having a generally rectangular opening therein being an intaglio of said tapered end portion and receiving said tapered end portion,
grooves in said handle on the side thereof remote from said valve,
said grooves radiating from the center of said handle, said stem having a reduced size threaded end thereon, a nut,
said nut being threadably received on said threaded end,
said nut having radially extending ribs thereon having the same spacing as said grooves,
said ribs having a rounded lower side whereby said ribs may be moved into and out of said grooves when said nut is tightened.

2. In combination, a valve and a handle therefor, said valve having a rotatable stem extending therefrom, a non-circular outwardly tapering end on said valve stem.
said handle being generally round in shape and having a non-circular opening therein being an intaglio of said tapered end and receiving said tapered end,
grooves in said handle on the side thereof remote from said valve,
said grooves radiating from said non-circular opening, a fastening member having rib means thereon engaging said grooved means on said handle, a portion of said member overlying said handle,
said rib means on the lower side of said member engaging said grooves on said handle,
said grooves and said ribs being adapted to hold said member against loosening,
said ribs being rounded on their lower edge whereby they may be forced out of said grooves when said member is rotated.

3. The combination recited in claim 2 wherein said threaded means comprises a threaded axially extending hole in said valve stem,
and said fastening member comprises a headed screw having said ribs on the head thereof and a threaded body threadably engaging said valve stem.

4. The combination recited in claim 2 wherein said handle is made of a relatively thin molded plastic material.

5. A handle for a valve or the like comprising
a relatively rigid central boss having a non-circular opening therethrough,
an outwardly extending, relatively thin flange extending from the top of said boss and defining a generally flat surface,
said opening terminating at its upper end in a central recess in the top of said boss and said flange,
said recess having a relatively flat bottom surface,
said bottom surface having grooves therein radiating outwardly from said opening,
said grooves being adapted to receive ribs on the lower side of a fastening member and a marginal flange integrally attached to said outwardly extending flange and extending generally perpendicularly thereto and toward and overlying said boss.

6. A handle for a valve comprising
a relatively thin, radially extending flange having a marginal flange integrally attached thereto defining a hand engaging surface,
a boss integrally attached to said flange and extending in a direction parallel to said marginal flange,
a non-circular central opening in said boss tapering inwardly toward said radially extending flange,
a counterbore in said radially extending flange defined by a flat bottom surface adapted to receive a nut, said central opening terminating at said counterbore,
and radially extending grooves in the bottom of said counterbore extending radially outwardly, said grooves being adapted to receive ribs on the adjacent side of a nut adapted to fasten a valve stem to said handle.

References Cited by the Examiner

UNITED STATES PATENTS

| | | | |
|---|---|---|---|
| 881,676 | 3/1908 | Fitzpatrick | 151—40 |
| 1,172,669 | 2/1916 | Caldwell | 287—53 X |
| 2,018,574 | 10/1935 | Richter | 151—40 X |
| 2,168,072 | 8/1939 | Rumely | 287—53 |

CARL W. TOMLIN, *Primary Examiner.*

THOMAS F. CALLAGAHAN, *Examiner.*